(12) United States Patent
Iwasaki et al.

(10) Patent No.: US 9,453,127 B2
(45) Date of Patent: Sep. 27, 2016

(54) THERMOPLASTIC RESIN COMPOSITION AND SHEET USING SAME

(71) Applicant: MITSUBISHI GAS CHEMICAL COMPANY, INC., Tokyo (JP)

(72) Inventors: Atsuko Iwasaki, Kanagawa (JP); Kazunobu Sato, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 14/402,451

(22) PCT Filed: Jul. 22, 2013

(86) PCT No.: PCT/JP2013/069736
§ 371 (c)(1),
(2) Date: Nov. 20, 2014

(87) PCT Pub. No.: WO2014/017415
PCT Pub. Date: Jan. 30, 2014

(65) Prior Publication Data
US 2015/0094431 A1    Apr. 2, 2015

(30) Foreign Application Priority Data
Jul. 24, 2012 (JP) ................................. 2012-163603

(51) Int. Cl.
| | |
|---|---|
| *C08L 69/00* | (2006.01) |
| *C08L 67/02* | (2006.01) |
| *C08G 63/672* | (2006.01) |
| *C08J 5/18* | (2006.01) |
| *C08L 67/00* | (2006.01) |
| *B32B 27/36* | (2006.01) |
| *B32B 27/08* | (2006.01) |
| *B32B 27/30* | (2006.01) |

(52) U.S. Cl.
CPC ................ *C08L 69/00* (2013.01); *B32B 27/08* (2013.01); *B32B 27/308* (2013.01); *B32B 27/36* (2013.01); *B32B 27/365* (2013.01); *C08G 63/672* (2013.01); *C08J 5/18* (2013.01); *C08L 67/00* (2013.01); *C08L 67/02* (2013.01); *B32B 2270/00* (2013.01); *B32B 2307/412* (2013.01); *B32B 2307/738* (2013.01); *B32B 2457/00* (2013.01); *B32B 2605/00* (2013.01); *C08J 2367/02* (2013.01); *C08J 2369/00* (2013.01); *C08L 2201/10* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| | | | | |
|---|---|---|---|---|
| 3,218,372 | A | * 11/1965 | Okamura | ............... C08G 63/64 525/439 |
| 7,067,186 | B2 | 6/2006 | Oguro et al. | |
| 2002/0037966 | A1* | 3/2002 | Weidner | .................. C08L 69/00 525/143 |
| 2003/0195303 | A1* | 10/2003 | Ikeda | ......................... C08J 5/18 525/418 |
| 2005/0075466 | A1 | 4/2005 | Oguro et al. | |

FOREIGN PATENT DOCUMENTS

| | | |
|---|---|---|
| EP | 0736558 | 9/1996 |
| EP | 1 321 491 | 6/2003 |
| EP | 1 460 106 | 9/2004 |
| EP | 1 847 561 | 10/2007 |
| JP | 49080162 | * 8/1974 |
| JP | 5-171020 | 7/1993 |
| JP | 9-216941 | 8/1997 |
| JP | 2003-246925 | 9/2003 |
| JP | 2005-2237 | 1/2005 |
| JP | 2005-281516 | 10/2005 |
| JP | 2006-249176 | 9/2006 |
| JP | 2008-189809 | 8/2008 |
| JP | 2008-223038 | 9/2008 |
| JP | 4470405 | 3/2010 |
| JP | 2011-219667 | 11/2011 |

OTHER PUBLICATIONS

Search report from PCT/JP2013/069736, mail date is Oct. 8, 2013.
Office Action in European Application No. 13823792.0 Dated Feb. 25, 2016.

* cited by examiner

*Primary Examiner* — David Buttner
(74) *Attorney, Agent, or Firm* — Greenblum & Bernstein, P.L.C.

(57) ABSTRACT

This thermoplastic resin composition (D) contains a polycarbonate resin (A), a polyester resin (B) which comprises diol structural units and dicarboxylic acid structural units in which the ratio of diol structural units having a cyclic acetal skeleton to all diol structural units is 20 to 60 mol %, and a polyester resin (C) other than the polyester resin (B), wherein the ratio of the polycarbonate resin (A) to the total of the polycarbonate resin (A), the polyester resin (B) and the polyester resin (C) is 15 to 98 wt %, the ratio of the polyester resin (B) is 1 to 80 wt %, and the ratio of the polyester resin (C) is 1 to 60 wt %; further provided is a sheet using said thermoplastic resin.

10 Claims, No Drawings

THERMOPLASTIC RESIN COMPOSITION AND SHEET USING SAME

TECHNICAL FIELD

The present invention relates to a thermoplastic resin composition comprising a polycarbonate resin and polyester resins, which is excellent in transparency, mechanical strength and molding processability, and a sheet using the same.

BACKGROUND ART

Polycarbonate resin (hereinafter sometimes referred to as "PC") has excellent heat resistance with its heat distortion temperature being high, further has excellent impact resistance and transparency, and is used in a wide range of fields such as exteriors, electronic and electric applications, optical disk substrates and automotive applications. However, in the case of using PC solely, there is a problem of poor molding processability because of its viscosity in the melt state higher than those of other thermoplastic resins, and it is strongly desired to improve molding processability (flowability) as molded products get thinner and larger. Moreover, PC also has a problem of poor chemical resistance, and there is a limitation on use for applications in which PC is contacted with a solvent.

Under such circumstances, for the purpose of improving moldability and chemical resistance of PC, a polymer alloy with a polyester resin such as polyethylene terephthalate resin (hereinafter sometimes referred to as "PET") and polybutylene terephthalate resin (hereinafter sometimes referred to as "PBT") has been proposed. However, when PC is mixed with PET or PBT as a modifier, it is difficult to obtain sufficient transparency.

In this regard, a technique of obtaining a transparent composition of PC and a polyester resin in which a transesterification catalyst is blended has been disclosed (for example, Patent Documents 1 and 2). However, there is a problem that foam formation is caused with progression of transesterification.

Further, Patent Document 3 describes that PC and a polyester resin are compatibilized by melting and kneading under a high shear stress. However, when employing such strong kneading, there is a problem that reduction of the molecular weight and heat deterioration of resin are caused by shearing heat.

Patent Document 4 describes that a sheet which is excellent in transparency, mechanical property, thermoformability, etc. can be obtained by finely dispersing PBT in PC and crystallizing the mixture under specific conditions. Meanwhile, Patent Document 5 describes that a resin composition which is excellent in transparency and thermoformability can be obtained by blending a specific polyester resin in PC and PET. However, it cannot be said that transparency in this case is sufficient and further improvement thereof has been desired.

In this regard, Patent Document 6 discloses that a thermoplastic resin composition which is excellent in transparency, heat resistance, chemical resistance and mechanical strength can be obtained by blending PC and a polyester resin containing diol having a cyclic acetal skeleton.

However, when the mixing ratio of PC in the resin composition is high, it is necessary to set a high roll temperature at the time of sheet molding and there is a limitation on equipments. Further, multi-layer sheet molding has a problem that a warpage of a sheet and adhesion to and winding around a roll tend to occur due to the difference of the glass transition temperature from that of other layers.

Moreover, when the mixing ratio of the polyester resin containing diol having a cyclic acetal skeleton is high and the mixing ratio of PC is low, roll contamination and mold contamination tend to occur, and the mechanical strength may be insufficient.

Therefore, a thermoplastic resin composition made of PC and a polyester resin, which is excellent in transparency, mechanical strength and molding processability, and which can be produced stably, and a sheet using the same have been desired.

PRIOR ART DOCUMENTS

Patent Documents

Patent Document 1: Japanese Laid-Open Patent Publication No. H05-171020
Patent Document 2: Japanese Laid-Open Patent Publication No. H09-216941
Patent Document 3: Japanese Patent No. 4470405
Patent Document 4: Japanese Laid-Open Patent Publication No. 2005-281516
Patent Document 5: Japanese Laid-Open Patent Publication No. 2006-249176
Patent Document 6: Japanese Laid-Open Patent Publication No. 2003-246925

SUMMARY OF THE INVENTION

Problems to be Solved by the Invention

In view of the aforementioned circumstances, the purpose of the present invention is to provide a thermoplastic resin composition comprising a PC and polyester resins, which is excellent in transparency, mechanical strength and molding processability and can be stably produced, and a sheet using the same.

Means for Solving the Problems

The present inventors diligently made researches in order to solve the above-described problems and found that a thermoplastic resin composition which is excellent in transparency, mechanical strength and molding processability can be obtained by combining a polycarbonate resin, a polyester resin such as PET and PBT and a polyester resin having a specific structure, and thus the present invention was achieved.

Specifically, the present invention relates to: a thermoplastic resin composition (D), which comprises: a polycarbonate resin (A); a polyester resin (B) which consists of diol structural units and dicarboxylic acid structural units, wherein the ratio of diol structural units having a cyclic acetal skeleton to all the diol structural units is 20 to 60 mol %; and a polyester resin (C) other than the polyester resin (B), wherein the ratio of the polycarbonate resin (A) to the total of the polycarbonate resin (A), the polyester resin (B) and the polyester resin (C) is 15 to 98 wt %, the ratio of the polyester resin (B) is 1 to 80 wt %, and the ratio of the polyester resin (C) is 1 to 60 wt %; and a sheet using the same.

Advantageous Effect of the Invention

The thermoplastic resin composition of the present invention is excellent in transparency, mechanical strength and molding processability, can be obtained in the form of an injection molded body, a sheet, a film or the like which has a good outer appearance, and can be utilized in a wide range of fields.

EMBODIMENTS FOR CARRYING OUT THE INVENTION

Hereinafter, the present invention will be described in detail. The thermoplastic resin composition (D) of the present invention is a thermoplastic resin composition, which comprises: a polycarbonate resin (A); a polyester resin (B) which consists of diol structural units and dicarboxylic acid structural units, wherein the ratio of diol structural units having a cyclic acetal skeleton to all the diol structural units is 20 to 60 mol %; and a polyester resin (C) other than the polyester resin (B), wherein the ratio of the polycarbonate resin (A) to the total of the polycarbonate resin (A), the polyester resin (B) and the polyester resin (C) is 15 to 98 wt %, the ratio of the polyester resin (B) is 1 to 80 wt %, and the ratio of the polyester resin (C) is 1 to 60 wt %.

The polycarbonate resin (A) to be used in the present invention is a polycarbonate polymer or copolymer which may have a branch structure, which can be obtained by reacting an aromatic dihydroxy compound or an aromatic dihydroxy compound and a small amount of a polyhydroxy compound with phosgene or diester carbonate.

The polycarbonate resin obtained from the aromatic dihydroxy compound is a polycarbonate resin containing repeat units represented by formula (1) and/or formula (2) below:

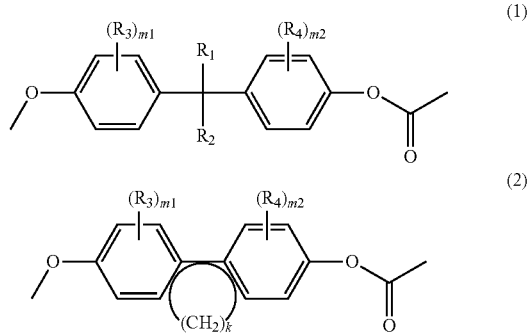

In the formulae, $R_1$ and $R_2$ are each independently selected from the group consisting of a hydrogen atom, a non-cyclic hydrocarbon group having 1 to 10 carbon atoms and an alicyclic hydrocarbon group having 5 to 10 carbon atoms. Examples of $R_1$ and $R_2$ include methyl, ethyl, propyl, n-propyl, isobutyl, pentyl and a cyclohexyl group. $R_3$ and $R_4$ are each independently selected from the group consisting of a non-cyclic hydrocarbon group having 1 to 10 carbon atoms, a halogen atom and a phenyl group. Examples of $R_3$ and $R_4$ include methyl, ethyl, propyl, n-butyl, isobutyl, pentyl, a phenyl group, a chlorine atom and a bromine atom. m1 and m2 are each independently 0, 1 or 2, and k is 4 or 5.

The aromatic dihydroxy compound constituting the polycarbonate resin (A) to be used in the present invention is not particularly limited, and examples thereof include: bis(hydroxyaryl)alkanes such as 2,2-bis(4-hydroxyphenyl)propane (also known as bisphenol A), 2,2-bis(3,5-dibromo-4-hydroxyphenyl)propane (also known as tetrabromobisphenol A), bis(4-hydroxyphenyl)methane, 1,1-bis(4-hydroxyphenyl)ethane, 2,2-bis(4-hydroxyphenyl)butane, 2,2-bis(4-hydroxyphenyl)octane, 2,2-bis(4-hydroxy-3-methylphenyl)propane, 1,1-bis(3-tert-butyl-4-hydroxyphenyl)propane, 2,2-bis(3-bromo-4-hydroxyphenyl)propane and 2,2-bis(3,5-dichloro-4-hydroxyphenyl)propane; bis(hydroxyaryl)cycloalkanes such as 1,1-bis(4-hydroxyphenyl)cyclopentane, 1,1-bis(4-hydroxyphenyl)cyclohexane (bisphenol Z), 1,1-bis(3,5-dibromo-4-hydroxyphenyl)cyclohexane and 1,1-bis(3,5-dichloro-4-hydroxyphenyl)cyclohexane; bis(hydroxyaryl)arylalkanes such as 1,1-bis(4-hydroxyphenyl)-1-phenylethane and 1,1-bis(4-hydroxyphenyl)diphenylmethane; dihydroxydiaryl ethers such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; hydroquinone; resorcin; and 4,4'-dihydroxydiphenyl. Among them, from the viewpoint of heat resistance, mechanical performance, economic efficiency, etc. of the thermoplastic resin composition (D), bisphenol A is particularly preferred.

The polycarbonate resin (A) of the present invention may have a branch structure, and for obtaining such a polycarbonate resin having a branch structure, polyhydroxy compounds such as phloroglucin, 2,6-dimethyl-2,4,6-tris(4-hydroxyphenyl)-3-heptene, 4,6-dimethyl-2,4,6-tris(4-hydroxyphenyl)-2-heptene, 1,3,5-tris(2-hydroxyphenyl)benzole, 1,1,1-tris(4-hydroxyphenyl)ethane, 2,6-bis(2-hydroxy-5-methylbenzyl)-4-methylphenol and α,α',α"-tris(4-hydroxyphenyl)-1,3,5-triisopropylbenzene, and polyhydroxy compounds such as 3,3-bis(4-hydroxyaryl)oxyindole (also known as 1,3-bisphenol), 5-chloro-1,3-bisphenol, 5,7-dichloro-1,3-bisphenol and 5-bromo-1,3-bisphenol may be used.

The viscosity-average molecular weight of the polycarbonate resin (A) to be used in the present invention is preferably 10,000 or more in maintaining the mechanical strength and preferably 30,000 or less from the viewpoint of moldability, but more preferably 12,000 or more and 28,000 or less. By setting the viscosity-average molecular weight within the above-described range, the thermoplastic resin composition (D) becomes excellent in mechanical strength and moldability.

The method for producing the polycarbonate resin (A) to be used in the present invention is not particularly limited, and conventionally known methods can be applied thereto. For example, the polycarbonate resin (A) can be obtained by reacting the aromatic dihydroxy compound with a carbonate precursor according to an interfacial polymerization method or melt polymerization method.

The polyester resin (B) to be used in the present invention is a polyester resin consisting of diol structural units and dicarboxylic acid structural units, wherein the ratio of diol structural units having a cyclic acetal skeleton to all the diol structural units is 20 to 60 mol %. The diol structural units having a cyclic acetal skeleton are preferably structural units derived from a compound represented by formula (3) or (4) below:

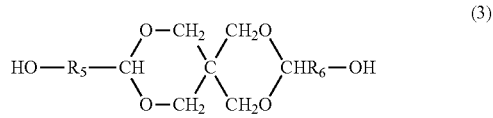

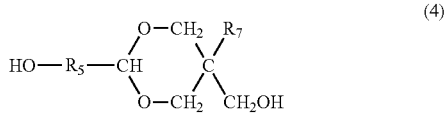

(4)

wherein $R_5$, $R_6$ and $R_7$ each independently represent a hydrocarbon group selected from the group consisting of an aliphatic hydrocarbon group having 1 to 10 carbon atoms, an alicyclic hydrocarbon group having 3 to 10 carbon atoms and an aromatic hydrocarbon group having 6 to 10 carbon atoms.

In the above-described formulae (3) and (4), $R_5$ and $R_6$ are each independently a divalent substituent, preferably an aliphatic hydrocarbon group having 1 to 10 carbon atoms, and more preferably any one type of group selected from the group consisting of a methylene group, an ethylene group, a propylene group, an isopropylene group, a butylene group and an isobutylene group. $R_7$ is a monovalent substituent, preferably an aliphatic hydrocarbon group having 1 to 10 carbon atoms, and more preferably any one type of group selected from the group consisting of a methyl group, an ethyl group, a propyl group, an isopropyl group, a butyl group and an isobutyl group.

Among them, as the compound of formula (3) or (4), 3,9-bis(1,1-dimethyl-2-hydroxyethyl)-2,4,8,10-tetraoxaspiro[5.5]undecane or 5-methylol-5-ethyl-2-(1,1-dimethyl-2-hydroxyethyl)-1,3-dioxane is particularly preferred.

Further, diol structural units other than the diol structural units having a cyclic acetal skeleton are not particularly limited, and examples thereof include structural units derived from: aliphatic diols such as ethylene glycol, trimethylene glycol, 1,4-butanediol, 1,5-pentanediol, 1,6-hexanediol, diethylene glycol, propylene glycol and neopentylglycol; polyether diols such as polyethylene glycol, polypropylene glycol and polybutylene glycol; alicyclic diols such as 1,3-cyclohexanedimethanol, 1,4-cyclohexanedimethanol, 1,2-decahydronaphthalenedimethanol, 1,3-decahydronaphthalenedimethanol, 1,4-decahydronaphthalenedimethanol, 1,5-decahydronaphthalenedimethanol, 1,6-decahydronaphthalenedimethanol, 2,7-decahydronaphthalenedimethanol, tetralindimethanol, norbornanedimethanol, tricyclodecanedimethanol and pentacyclododecanedimethanol; bisphenols such as 4,4'-(1-methylethylidene)bisphenol, methylene bisphenol (also known as bisphenol F), 4,4'-cyclohexylidene bisphenol (also known as bisphenol Z) and 4,4'-sulfonylbisphenol (also known as bisphenol S); alkylene oxide adducts of the above-described bisphenols; aromatic dihydroxy compounds such as hydroquinone, resorcin, 4,4'-dihydroxybiphenyl, 4,4'-dihydroxydiphenyl ether and 4,4'-dihydroxydiphenyl benzophenone; and alkylene oxide adducts of the above-described aromatic dihydroxy compounds. From the viewpoint of mechanical performance, economic efficiency, etc. of the thermoplastic resin composition of the present invention, structural units derived from ethylene glycol, diethylene glycol, trimethylene glycol, 1,4-butanediol and 1,4-cyclohexanedimethanol are preferred, and structural units derived from ethylene glycol are particularly preferred. The diols listed above may be used solely or in combination.

The ratio of the diol structural units having a cyclic acetal skeleton in the polyester resin (B) is 20 to 60 mol %, preferably 25 to 55 mol %, and particularly preferably 30 to 50 mol %. When the ratio of the diol structural units having a cyclic acetal skeleton is 20 to 60 mol %, the thermoplastic resin composition (D) becomes particularly excellent in transparency, heat resistance and mechanical strength.

Further, the dicarboxylic acid structural units of the polyester resin (B) are not particularly limited, but examples thereof include structural units derived from: aliphatic dicarboxylic acids such as succinic acid, glutaric acid, adipic acid, pimelic acid, suberic acid, azelaic acid, sebacic acid, dodecanedicarboxylic acid, cyclohexanedicarboxylic acid, decanedicarboxylic acid, norbornanedicarboxylic acid, tricyclodecanedicarboxylic acid and pentacyclododecanedicarboxylic acid; and aromatic dicarboxylic acids such as terephthalic acid, isophthalic acid, phthalic acid, 2-methylterephthalic acid, 1,4-naphthalenedicarboxylic acid, 1,5-naphthalenedicarboxylic acid, 2,6-naphthalenedicarboxylic acid, 2,7-naphthalenedicarboxylic acid, biphenyldicarboxylic acid and tetralin dicarboxylic acid. From the viewpoint of mechanical performance and heat resistance of the thermoplastic resin composition (D) of the present invention, structural units derived from aromatic dicarboxylic acids such as terephthalic acid, isophthalic acid, 1,4-naphthalenedicarboxylic acid, 1,5-naphthalenedicarboxylic acid, 2,6-naphthalenedicarboxylic acid and 2,7-naphthalenedicarboxylic acid are preferred, and structural units derived from terephthalic acid, 2,6-naphthalenedicarboxylic acid and isophthalic acid are particularly preferred. Among them, from the viewpoint of economic efficiency, structural units derived from terephthalic acid are most preferred. The dicarboxylic acids listed above may be used solely or in combination.

The ratio of structural units derived from aromatic dicarboxylic acids to all the dicarboxylic acid structural units in the polyester resin (B) is preferably 70 mol % or more, more preferably 80 mol % or more, particularly preferably 90 mol % or more, and most preferably 100 mol %. When the ratio of the structural units derived from aromatic dicarboxylic acids to all the dicarboxylic acid structural units in the polyester resin (B) is set within the above-described range, the thermoplastic resin composition (D) becomes more excellent in heat resistance, mechanical strength and chemical resistance.

The method for producing the polyester resin (B) of the present invention is not particularly limited, and conventionally known methods can be applied thereto. Examples thereof include a melt polymerization method such as a transesterification method and a direct esterification method and a solution polymerization method.

The polyester resin (B) is produced in the presence of a publicly-known catalyst. Examples of the publicly-known catalyst include fatty acid salts, carbonates, phosphates, hydroxides, chlorides and oxides of metallic magnesium, sodium, alkoxide of magnesium, zinc, lead, cerium, cadmium, manganese, cobalt, lithium, sodium, potassium, calcium, nickel, magnesium, vanadium, aluminium, titanium, tin, germanium, antimony and the like. These substances may be used solely or in combination for the production of the polyester resin (B).

The melt viscosity of the polyester resin (B) to be used in the present invention is preferably in the range of from 500 to 2000 Pa·s when performing the measurement at a measurement temperature of 240° C. and a shear rate of 100 s$^{-1}$. When the melt viscosity is within the above-described range, the polycarbonate resin (A) and the polyester resin (C) can be mixed well at the time of melting and kneading them, and the thermoplastic resin composition (D) having excellent transparency, mechanical strength and moldability can be obtained.

The limiting viscosity of the polyester resin (B) to be used in the present invention (value measured in a mixed solvent in which the mass ratio of phenol/1,1,2,2-tetrachloroethane is 6/4 at 25° C.) is not particularly limited, but is preferably 0.3 to 2.0 dl/g, and more preferably 0.4 to 1.8 dl/g. When the limiting viscosity is 0.3 or more, the molecular weight of the polyester resin (B) is sufficiently high, and therefore, a sheet produced by using the thermoplastic resin composition (D) obtained by using this has a particularly excellent mechanical strength.

The molecular weight distribution of the polyester resin (B) is preferably 2.5 to 12.0, and more preferably 2.5 to 8.0. When the molecular weight distribution is within the above-described range, moldability for a film, sheet, thin-walled hollow container, etc. is particularly excellent. In this regard, the molecular weight distribution refers to the ratio of the weight average molecular weight (Mw) to the number average molecular weight (Mn) (Mw/Mn).

The polyester resin (C) to be used in the present invention is a polyester resin other than the above-described polyester resin (B) and is a polyester obtained by reacting a dicarboxylic acid or a derivative thereof with a diol or a derivative thereof according to a publicly-known method. Conventionally known polyesters can be widely used, and there is no particular limitation.

The dicarboxylic acid structural units of the polyester resin (C) to be used in the present invention are not particularly limited, and examples thereof include structural units derived from: aliphatic dicarboxylic acids such as succinic acid, glutaric acid, adipic acid, pimelic acid, suberic acid, azelaic acid, sebacic acid, dodecanedicarboxylic acid, cyclohexanedicarboxylic acid, decanedicarboxylic acid, norbornanedicarboxylic acid, tricyclodecanedicarboxylic acid and pentacyclododecanedicarboxylic acid; and aromatic dicarboxylic acids such as terephthalic acid, isophthalic acid, phthalic acid, 2-methylterephthalic acid, 1,4-naphthalenedicarboxylic acid, 1,5-naphthalenedicarboxylic acid, 2,6-naphthalenedicarboxylic acid, 2,7-naphthalenedicarboxylic acid, biphenyldicarboxylic acid and tetralin dicarboxylic acid.

Further, the diol structural units of the polyester resin (C) to be used in the present invention are not particularly limited, and examples thereof include structural units derived from: aliphatic diols such as ethylene glycol, trimethylene glycol, 1,4-butanediol, 1,5-pentanediol, 1,6-hexanediol, diethylene glycol, propylene glycol and neopentylglycol; polyether diols such as polyethylene glycol, polypropylene glycol and polybutylene glycol; alicyclic diols such as 1,3-cyclohexanedimethanol, 1,4-cyclohexanedimethanol, 1,2-decahydronaphthalenedimethanol, 1,3-decahydronaphthalenedimethanol, 1,4-decahydronaphthalenedimethanol, 1,5-decahydronaphthalenedimethanol, 1,6-decahydronaphthalenedimethanol, 2,7-decahydronaphthalenedimethanol, tetralindimethanol, norbornanedimethanol, tricyclodecanedimethanol and pentacyclododecanedimethanol; bisphenols such as 4,4'-(1-methylethylidene)bisphenol, methylene bisphenol (also known as bisphenol F), 4,4'-cyclohexylidene bisphenol (also known as bisphenol Z) and 4,4'-sulfonylbisphenol (also known as bisphenol S); alkylene oxide adducts of the above-described bisphenols; aromatic dihydroxy compounds such as hydroquinone, resorcin, 4,4'-dihydroxybiphenyl, 4,4'-dihydroxydiphenyl ether and 4,4'-dihydroxydiphenyl benzophenone; and alkylene oxide adducts of the above-described aromatic dihydroxy compounds.

Specific examples of the polyester resin (C) include polybutylene terephthalate, polybutylene (terephthalate/isophthalate), polybutylene (terephthalate/adipate), polybutylene (terephthalate/sebacate), polybutylene (terephthalate/decanedicarboxylate), polybutylene naphthalate, polyethylene terephthalate, polyethylene (terephthalate/isophthalate), polyethylene (terephthalate/adipate), polyethylene (terephthalate/5-sodium sulfoisophthalate), polybutylene (terephthalate/5-sodium sulfoisophthalate), polyethylene naphthalate, polycyclohexanedimethylene terephthalate and polypropylene terephthalate. Among them, polybutylene terephthalate, polybutylene (terephthalate/adipate), polybutylene (terephthalate/decanedicarboxylate), polybutylene naphthalate, polyethylene terephthalate, polyethylene (terephthalate/adipate), polyethylene naphthalate, polycyclohexanedimethylene terephthalate, polypropylene terephthalate, etc. are particularly preferred, and polybutylene terephthalate is most preferred.

The method for producing the polyester resin (C) is not particularly limited, and conventionally known methods can be applied thereto. Examples thereof include a melt polymerization method such as a transesterification method and a direct esterification method and a solution polymerization method. Further, as a catalyst for esterification reaction or polycondensation catalyst, a conventionally known catalyst can be used. For example, compounds containing titanium, tin, magnesium, calcium, zirconium, antimony or germanium and the like can be used.

In addition to the polycarbonate resin (A), the polyester resin (B) and the polyester resin (C), the thermoplastic resin composition (D) of the present invention may further contain a phosphorus compound (E). When the phosphorus compound (E) is contained, transesterification reactions caused between resin components, i.e., the polycarbonate resin (A) and the polyester resin (B), and the polycarbonate resin (A) and the polyester resin (C), are effectively suppressed during melting and kneading or melting and molding, problems such as foam formation are solved, and molding properties such as thermal stability at the time of melting and molding are improved.

Examples of the phosphorus compound (E) to be used in the present invention include phosphites, phosphates and condensed phosphates. Among them, phosphates and condensed phosphates are preferred. These substances may be used solely, or two or more types of them may be used simultaneously.

In addition to the polycarbonate resin (A), the polyester resin (B) and the polyester resin (C), the thermoplastic resin composition (D) of the present invention may contain other resins and various types of additives without inhibiting the purpose of the present invention. These substances may be added solely, or two or more types of these may be added in combination.

Examples of the aforementioned other resins include styrene-based resins such as acrylonitrile-styrene copolymer, acrylonitrile-butadiene-styrene copolymer and polystyrene, polyolefin resins such as polyethylene and polypropylene, vinyl chloride resin, polyamide resin, polyimide resin, polyetherimide resin, polyurethane resin, polyphenylene ether resin, acrylic resin, phenol resin and epoxy resin.

Examples of the aforementioned various types of additives include an antistatic agent, a flame retardant, a lubricant, an antioxidant, a light stabilizer, an ultraviolet absorber, a mold release agent, a pigment and an inorganic filler.

The method for producing the thermoplastic resin composition (D) is not particularly limited, and a well-known method can be employed. Examples thereof include a dry blend method and a method in which a dry-blended product is melted and kneaded by an extruder or the like.

The procedure for mixing the polycarbonate resin (A), the polyester resin (B) and the polyester resin (C) is not particularly limited. These substances (A), (B) and (C) may be mixed simultaneously. Alternatively, the polyester resin (B) may be mixed with the polyester resin (C) in advance, followed by mixing the polycarbonate resin (A) therewith. Alternatively, one of the polyester resin (B) and the polyester resin (C) may be mixed with the polycarbonate resin (A), followed by mixing the remaining polyester resin therewith.

The ratio of the polycarbonate resin (A) to the total of the polycarbonate resin (A), the polyester resin (B) and the polyester resin (C) in the thermoplastic resin composition (D) of the present invention is preferably 15 to 98 wt %, more preferably 40 to 90 wt %, and particularly preferably 60 to 80 wt %. When the ratio is more than 98 wt %, the molding processability (flowability) tends to be reduced, and when the ratio is less than 15 wt %, the mechanical strength tends to be reduced.

The ratio of the polyester resin (B) to the total of the polycarbonate resin (A), the polyester resin (B) and the polyester resin (C) in the thermoplastic resin composition (D) of the present invention is preferably 1 to 80 wt %, more preferably 2 to 50 wt %, and particularly preferably 5 to 25 wt %. When the ratio is more than 80 wt %, reduction in the mechanical strength and roll contamination at the time of molding tend to occur, and when the ratio is less than 1 wt %, it becomes difficult to maintain the transparency of the thermoplastic resin composition (D), and therefore undesirable.

The ratio of the polyester resin (C) to the total of the polycarbonate resin (A), the polyester resin (B) and the polyester resin (C) in the thermoplastic resin composition (D) of the present invention is preferably 1 to 60 wt %, more preferably 4 to 20 wt %, and particularly preferably 8 to 20 wt %. When the ratio is more than 60 wt %, the transparency tends to be reduced, and when the ratio is less than 1 wt %, the improvement of the flowability and reduction in the glass transition temperature become insufficient, which tends to cause reduction in the molding processability, and therefore undesirable.

Even more preferably, to the total of the polycarbonate resin (A), the polyester resin (B) and the polyester resin (C) in the thermoplastic resin composition (D) of the present invention, the ratio of the polycarbonate resin (A) is 60 to 80 wt %, the ratio of the polyester resin (B) is 5 to 25 wt %, and the ratio of the polyester resin (C) is 8 to 20 wt %.

The total light transmittance of the injection molded body of the thermoplastic resin composition (D) having a thickness of 3.2 mm (the measurement method will be described later) is preferably 87% or more, more preferably 88% or more, and particularly preferably 89% or more from the viewpoint of transparency. Meanwhile, the haze value of the injection molded body of the thermoplastic resin composition (D) having a thickness of 3.2 mm (the measurement method will be described later) is preferably 3% or less, more preferably 2% or less, and particularly preferably 1.5% or less.

The impact strength of the injection molded body of the thermoplastic resin composition (D) having a thickness of 3.2 mm in the notched Izod impact test (the measurement method will be described later) is preferably 28 J/m or more, more preferably 30 J/m or more, and particularly preferably 40 J/m or more from the viewpoint of impact resistance.

The melt viscosity of the injection molded body of the thermoplastic resin composition (D) having a thickness of 3.2 mm in the measurement at a measurement temperature of 240° C. at a shear rate of 100 s$^{-1}$ (the measurement method will be described later) is preferably in the range of 300 to 3000 Pa·s, more preferably in the range of 1000 to 3000 Pa·s, even more preferably in the range of 1000 to 2500 Pa·s, and particularly preferably in the range of 1000 to 2000 Pa·s. When the melt viscosity of the thermoplastic resin composition (D) is within the above-described range, in particular, good injection molding processability, extrusion molding processability and foam molding processability can be obtained. Moreover, in the case of a molded body such as a sheet obtained from the thermoplastic resin composition (D), not only good formativeness and deep drawability can be obtained at the time of vacuum pressure molding, but also good secondary workability for cold bending, drilling, punching, etc. can be obtained.

The glass transition temperature of the thermoplastic resin composition (D) (the measurement method will be described later) is preferably 90 to 145° C., more preferably 95 to 140° C., and particularly preferably 100 to 135° C.

Particularly preferably, the thermoplastic resin composition (D) of the present invention has a glass transition temperature of 95 to 140° C., a melt viscosity of 1000 to 2500 Pa·s, a total light transmittance of 88% or more, a haze value of 2% or less, and an Izod impact strength of 30 μm or more.

When the thermoplastic resin composition (D) of the present invention is molded, conventionally known molding methods can be used without particular limitation, and examples thereof include injection molding, extrusion molding, calender molding, extrusion foam molding, extrusion blow molding and injection blow molding.

As the molded body using the thermoplastic resin composition (D) of the present invention, a sheet is particularly preferred. The method for obtaining a sheet from the thermoplastic resin composition (D) is not particularly limited, and conventionally known methods can be used. For example, extrusion molding or cast molding can be used.

As the method for obtaining a multi-layer sheet from the thermoplastic resin composition (D) of the present invention, publicly-known laminating techniques such as a coextrusion method, a coextrusion lamination method, an extrusion lamination method and a dry lamination method can be used. Further, for such lamination, an adhesive or adhesive resin suitable to be used between resins may be used.

A particularly preferred structure of the multi-layer sheet of the present invention is obtained by molding the thermoplastic resin composition (D) and one or more types of transparent resins selected from polyester resin, acrylic resin, polystyrene resin, polycarbonate resin, a methyl methacrylate-styrene copolymer, an acrylonitrile-butadiene-styrene copolymer, vinyl chloride resin and alicyclic polyolefin resin into a multi-layer sheet having at least 2 layers.

The structure of the multi-layer sheet of the present invention may be selected according to an intended use of the sheet, and examples thereof include a two-layer structure consisting of two types of layers (thermoplastic resin composition (D) layer/transparent resin layer), a three-layer structure consisting of two types of layers (transparent resin layer/thermoplastic resin composition (D) layer/transparent resin layer or thermoplastic resin composition (D) layer/transparent resin layer/thermoplastic resin composition (D) layer), and a three-layer structure consisting of three types of layers (thermoplastic resin composition (D) layer/transparent resin layer/transparent resin layer).

Specific examples of the intended use of the thermoplastic resin composition (D) of the present invention include a front plate sheet, a reflection sheet, an IC card, a blister, a packaging material, a label, a tray, a decorative molded body, a decorative film, a transparent heat-insulating film, a container for a perfume, dye, cosmetic product or the like, a solvent bottle, electric and electronic parts and automobile parts.

EXAMPLES

Hereinafter, the present invention will be more specifically described by way of examples. However, the scope of the present invention is not limited by these examples.

Raw materials used in the Examples and Comparative Examples are described below:

[Polycarbonate resin (A)]
(A-1) trade name: Iupilon S-3000 (Mitsubishi Engineering-Plastics Corporation)
(A-2) trade name: Iupilon E-2000 (Mitsubishi Engineering-Plastics Corporation)
[Polyester resin (C)]
(C-1) trade name: Novaduran 5001 (Mitsubishi Engineering-Plastics Corporation): polybutylene terephthalate
(C-2) trade name: RT553C (Nippon Unipet Co., Ltd.): polyethylene terephthalate
[Phosphorus compound (E)] trade name: PX-200 (Daihachi Chemical Industry Co., Ltd.)
[Production of Polyester Resins (B-1) and (B-2)]

In a 150 l polyester resin production apparatus equipped with a packed column type rectifier, a partial condenser, a total condenser, a cold trap, a stirrer, a superheater equipment and a nitrogen introducing tube, terephthalic acid and ethylene glycol in the amounts described in Table 1 were fed, and an esterification reaction was performed according to the common method. To the obtained ester, ethylene glycol for depolymerization and germanium dioxide in the amounts described in Table 1 were added, and a depolymerization was performed at 225° C. under a nitrogen gas stream. The reaction was performed for 3 hours while water produced was distilled away, and after that, ethylene glycol was distilled away at 215° C. at 13.3 kPa. To the obtained ester, tetra-n-butyl titanate, potassium acetate, triethyl phosphate and SPG in the amounts described in Table 1 were added, and a reaction was performed at 225° C. at 13.3 kPa for 3 hours. The obtained ester was subjected to temperature rising and pressure reduction, and finally a polycondensation reaction was performed at 270° C. under high vacuum (300 Pa or less). When the melt viscosity reached a predetermined value, the reaction was terminated, thereby obtaining the polyester resin (B).

Note that the meanings of the abbreviations in the table are as follows:

PTA: terephthalic acid
SPG: 3,9-bis(1,1-dimethyl-2-hydroxyethyl)-2,4,8,10-tetraoxaspiro[5.5]undecane
EG: ethylene glycol
$GeO_2$: germanium dioxide
TBT: tetra-n-butyl titanate
AcOK: potassium acetate
TEP: triethyl phosphate

TABLE 1

| | Polyester resin (B) | |
|---|---|---|
| | Polyester resin (B-1) | Polyester resin (B-2) |
| Components blended at the time of polymerization Dicarboxylic acid component (g) | | |
| PTA | 33093 | 37634 |
| Diol component (g) | | |
| SPG | 27891 | 21375 |
| EG | 13971 | 15888 |
| EG for depolymerization | 13229 | 15045 |
| $GeO_2$ (g) | 5.2 | 5.9 |
| TBT (g) | 3.4 | 3.9 |
| AcOK (g) | 3.9 | 4.4 |
| TEP (g) | 18.1 | 20.6 |
| Evaluation results of polyester resin (B) | | |
| Ratio of diol structural units having a cyclic acetal skeleton (mol %) | 45 | 30 |
| Glass transition temperature (° C.) | 109 | 101 |
| Number average molecular weight Mn (ten thousand) | 1.5 | 1.51 |
| Molecular weight distribution Mw/Mn | 3.6 | 3.9 |
| Melt viscosity (Pa · s) | 760 | 890 |

The methods for evaluating the polyester resins (B-1) and (B-2) are as described below.

(1) Ratio of Diol Structural Units Having a Cyclic Acetal Skeleton

The ratio of the diol units having a cyclic acetal skeleton in the polyester resin was calculated from the $^1$H-NMR measurement and the peak area ratio, wherein 20 mg of the polyester resin was dissolved in 1 g of deuterated chloroform. As a measurement apparatus, JNM-AL400 manufactured by JEOL Ltd. was used, and the measurement was carried out at 400 MHz.

(2) Glass Transition Temperature

For obtaining the glass transition temperature of the polyester resin, DSC/TA-SOWS manufactured by Shimadzu Corporation was used, about 10 mg of a sample was put into an unsealed container made of aluminium, and the measurement was carried out under a nitrogen gas stream (30 ml/min.) at a temperature elevation rate of 20° C./min. The temperature changed by ½ of the difference between the baselines on the DSC curve before and after transition was taken as the glass transition temperature.

(3) Molecular Weight (Number Average Molecular Weight Mn, Weight Average Molecular Weight Mw, Molecular Weight Distribution Mw/Mn)

2 mg of the polyester resin was dissolved in 20 g of chloroform, and the measurement was carried out by gel permeation chromatography (GPC), wherein the data calibrated with a standard polystyrene were taken as Mn and Mw/Mn. For GPC, TOSOH 8020 manufactured by Tosoh Corporation, to which two columns of GMHHR-L and one column of TSK G5000HR manufactured by Tosoh Corporation were connected, was used and the measurement was carried out at a column temperature of 40° C. As an eluent, chloroform was flowed at a flow rate of 1.0 ml/min., and the measurement was carried out with a UV detector.

(4) Melt Viscosity

As a measurement apparatus, Capirograph 1C manufactured by Toyo Seiki Co., Ltd. was used, and the measurement was carried out under the following conditions: temperature: 240° C., preheating time: 1 min., nozzle diameter: 1 mm, nozzle length: 10 mm, and shear rate: 100 (1/sec).

(1) Preparation of Thermoplastic Resin Composition (D)

The polyester resin (B) and the polyester resin (C) at the ratios shown in Tables 2 to 6 below and PX-200 (Daihachi Chemical Industry Co., Ltd.) (phosphorus compound (E)) at a ratio of 0.2 wt % relative to the polyester resin (B) were dry-blended using a tumbler, and the mixture was melt-kneaded using a twin screw extruder (TEM37BS manufactured by Toshiba Machine Co., Ltd.) at a cylinder temperature of 210 to 240° C., a die temperature of 240° C., and a screw rotation speed of 100 rpm, thereby obtaining a pellet-type resin composition. This pellet-type resin composition and the polycarbonate resin (A) were dry-blended using a tumbler, and the mixture was melt-kneaded using a twin screw extruder (TEM37BS manufactured by Toshiba Machine Co., Ltd.) at a cylinder temperature of 210 to 280° C., a die temperature of 240 to 275° C., and a screw rotation speed of 100 rpm, thereby obtaining a pellet-type thermoplastic resin composition (D).

(2) Preparation of Injection Molded Body

The thermoplastic resin composition (D) was molded into test pieces having a thickness of 3.2 mm using a screw injection molding machine (screw diameter: 32 mm, mold locking force: 9.8 IN) at a cylinder temperature of 260 to 280° C. and a mold temperature of 35° C.

(3) Preparation of Multi-Layer Sheet

Extrusion was carried out using a 32 mm single screw extruder, a 65 mm single screw extruder and a 25 mm single screw extruder, and a multi-layer extrusion apparatus, which has a feed block connected to all the extruders and a T-die connected to the feed block, was used to prepare a multi-layer sheet (a three-layer structure consisting of three types of layers). Alternatively, extrusion was carried out using a 32 mm single screw extruder and a 65 mm single screw extruder, and a multi-layer extrusion apparatus, which has a feed block connected to all the extruders and a T-die connected to the feed block, was used to prepare a multi-layer sheet (a two-layer structure consisting of two types of layers).

An acrylic resin (Altuglas V-825 manufactured by Arkema) was extruded by a 32 mm single screw extruder, a mixture of a polycarbonate resin (Iupilon S-3000 manufactured by Mitsubishi Engineering-Plastics Corporation) and the polyester resin (B) was extruded by a 65 mm single screw extruder, the thermoplastic resin composition (D) was extruded by a 25 mm single screw extruder, and a multi-layer extrusion apparatus, which has a feed block connected to all the extruders and a T-die connected to the feed block, was used to prepare a multi-layer sheet (a three-layer structure consisting of three types of layers or a two-layer structure consisting of two types of layers) (the resins used in the respective layers and the ratio thereof are shown in Table 7).

[Method for Evaluating Thermoplastic Resin Composition (D)]

Glass Transition Temperature

For obtaining the glass transition temperature of the thermoplastic resin composition (D), DSC/TA-SOWS manufactured by Shimadzu Corporation was used, about 10 mg of a sample was put into an unsealed container made of aluminium, and the measurement was carried out under a nitrogen gas stream (30 ml/min.) at a temperature elevation rate of 20° C./min. The temperature changed by ½ of the difference between the baselines on the DSC curve before and after transition was taken as the glass transition temperature.

Melt Viscosity

As a measurement apparatus, Capirograph 1C manufactured by Toyo Seiki Co., Ltd. was used, and the measurement was carried out under the following conditions: temperature: 240° C., preheating time: 1 min., nozzle diameter: 1 mm, nozzle length: 10 mm, and shear rate: 100 (1/sec).

Total Light Transmittance and Haze Value

The measurement was carried out according to JIS K7105 using an injection molded body having a thickness of 3.2 mm. As a measurement apparatus, a haze meter (model: COH-300A) manufactured by Nippon Denshoku Industries Co., Ltd. was used.

Impact Resistance

The notched Izod impact strength was measured according to JIS K7110 using a test piece having a thickness of 3.2 mm. The case where the test piece was not broken (value exceeded 116 J/m as the measurement limit value) was described as NB.

[Method for Evaluating Multi-Layer Sheet]

(1) Roll Releasability

The case where adhesion to the roll was seen at the time of molding the multi-layer sheet is represented by x, and the case where adhesion to the roll was not seen is represented by ○.

(2) Roll Contamination

The case where roll contamination was seen at the time of molding the multi-layer sheet is represented by x, and the case where roll contamination was not seen is represented by ○.

Examples 1-17 and Comparative Examples 1-10

The evaluation results are shown in Tables 2-7.

TABLE 2

|  | Example 1 | Example 2 | Example 3 | Example 4 | Example 5 |
|---|---|---|---|---|---|
| Polycarbonate resin (A) | A-1 | A-1 | A-1 | A-1 | A-1 |
| Polyester resin (B) | B-1 | B-1 | B-1 | B-1 | B-1 |
| Polyester resin (C) | C-1 | C-1 | C-1 | C-1 | C-1 |
| Resin composition of thermoplastic resin composition (D) (wt %) | | | | | |
| Polycarbonate resin (A) | 60 | 70 | 80 | 40 | 80 |
| Polyester resin (B) | 24 | 12 | 4 | 48 | 8 |
| Polyester resin (C) | 16 | 18 | 16 | 12 | 12 |
| Evaluation results of thermoplastic resin composition (D) | | | | | |
| Glass transition temperature (° C.) | 112 | 114 | 120 | 109 | 124 |
| Melt viscosity (Pa · s) 240° C. | 1160 | 1230 | 1430 | 1020 | 1590 |
| Total light transmittance (%) | 88 | 89 | 90 | 90 | 90 |
| Haze value (%) | 1.4 | 1.0 | 0.4 | 0.7 | 0.8 |
| Izod (J/m) | 42 | 54 | 80 | 36 | 71 |

TABLE 3

|  | Example 6 | Example 7 | Example 8 | Example 9 | Example 10 |
|---|---|---|---|---|---|
| Polycarbonate resin (A) | A-1 | A-1 | A-1 | A-2 | A-1 |
| Polyester resin (B) | B-1 | B-1 | B-1 | B-1 | B-1 |
| Polyester resin (C) | C-1 | C-1 | C-1 | C-1 | C-1 |
| Resin composition of thermoplastic resin composition (D) (wt %) | | | | | |
| Polycarbonate resin (A) | 80 | 90 | 90 | 60 | 20 |
| Polyester resin (B) | 12 | 2 | 4 | 36 | 64 |
| Polyester resin (C) | 8 | 8 | 6 | 4 | 16 |
| Evaluation results of thermoplastic resin composition (D) | | | | | |
| Glass transition temperature (° C.) | 129 | 134 | 136 | 125 | 97 |
| Melt viscosity (Pa·s) 240° C. | 1820 | 2070 | 2260 | 2780 | 770 |
| Total light transmittance (%) | 89 | 89 | 89 | 88 | 89 |
| Haze value (%) | 0.8 | 0.4 | 0.5 | 1.6 | 0.7 |
| Izod (J/m) | 77 | NB | NB | 37 | 28 |

TABLE 4

|  | Example 11 | Example 12 | Example 13 | Example 14 |
|---|---|---|---|---|
| Polycarbonate resin (A) | A-1 | A-2 | A-2 | A-1 |
| Polyester resin (B) | B-2 | B-2 | B-2 | B-2 |
| Polyester resin (C) | C-1 | C-1 | C-1 | C-2 |
| Resin composition of thermoplastic resin composition (D) (wt %) | | | | |
| Polycarbonate resin (A) | 90 | 60 | 60 | 72 |
| Polyester resin (B) | 3 | 28 | 32 | 18 |
| Polyester resin (C) | 7 | 12 | 8 | 10 |
| Evaluation results of thermoplastic resin composition (D) | | | | |
| Glass transition temperature (° C.) | 132 | 115 | 115 | 97 |
| Melt viscosity (Pa·s) 240° C. | 1420 | 2370 | 2340 | 2050 |
| Total light transmittance (%) | 89 | 89 | 89 | 88 |
| Haze value (%) | 0.7 | 1.2 | 1.3 | 2.0 |
| Izod (J/m) | 107 | 38 | 40 | 59 |

TABLE 5

|  | Comparative Example 1 | Comparative Example 2 | Comparative Example 3 | Comparative Example 4 |
|---|---|---|---|---|
| Polycarbonate resin (A) | A-1 | A-2 | A-2 | A-1 |
| Polyester resin (B) |  |  |  | B-2 |
| Polyester resin (C) |  | C-1 | C-2 | C-1 |
| Resin composition of thermoplastic resin composition (D) (wt %) | | | | |
| Polycarbonate resin (A) | 100 | 70 | 70 | 20 |
| Polyester resin (B) | 0 | 0 | 0 | 16 |
| Polyester resin (C) | 0 | 30 | 30 | 64 |
| Evaluation results of thermoplastic resin composition (D) | | | | |
| Glass transition temperature (° C.) | 152 | 101 | 81 | — |
| Melt viscosity (Pa·s) 240° C. | 3230 | 1780 | 3300 | 1360 |
| Total light transmittance (%) | 90 | 75 | 57 | 59 |
| Haze value (%) | 0.3 | 10.6 | 41.2 | 87.5 |
| Izod (J/m) | 754 | 87 | 42 | 32 |

TABLE 6

|  | Comparative Example 5 | Comparative Example 6 | Comparative Example 7 | Comparative Example 8 |
|---|---|---|---|---|
| Polycarbonate resin (A) | A-1 | A-1 | A-1 | A-2 |
| Polyester resin (B) | B-1 | B-1 | B-1 | B-1 |
| Polyester resin (C) |  |  |  |  |
| Resin composition of thermoplastic resin composition (D) (wt %) | | | | |
| Polycarbonate resin (A) | 20 | 60 | 80 | 60 |
| Polyester resin (B) | 80 | 40 | 20 | 40 |
| Polyester resin (C) | 0 | 0 | 0 | 0 |
| Evaluation results of thermoplastic resin composition (D) | | | | |
| Glass transition temperature (° C.) | 113 | 128 | 140 | 128 |
| Melt viscosity (Pa·s) 240° C. | 1000 | 2860 | 2530 | 2860 |
| Total light transmittance (%) | 87 | 87 | 87 | 87 |
| Haze value (%) | 1.0 | 1.5 | 1.7 | 1.8 |
| Izod (J/m) | 25 | 32 | 81 | 43 |

In Comparative Examples 6-8, the values of the melt viscosity were relatively high (more than 2500 Pa·s). When the viscosity is high, it is necessary to increase the molding temperature, usable apparatuses are limited, and resins may be deteriorated. Further, in Comparative Examples 6-8, the total light transmittance was poorer than that of the Examples (by 1 to 2%). Just the difference by 1% results in dark impression of the outer appearance.

TABLE 7

|  | Example 15 | Example 16 | Example 17 | Comparative Example 9 | Comparative Example 10 |
|---|---|---|---|---|---|
| Skin layer 1 | PMMA | PMMA | PMMA | PMMA | PMMA |
| Core layer | Comparative Example 5 | Comparative Example 5 | Comparative Example 5 | Comparative Example 5 | Comparative Example 6 |
| Skin layer 2 | Example 1 | Example 2 | Example 3 | — | — |
| Layer ratio | 6/89/5 | 6/89/5 | 6/89/5 | 6/94 | 6/94 |
| Evaluation results |  |  |  |  |  |
| Roll releasability | ○ | ○ | ○ | ○ | X |
| Roll contamination | ○ | ○ | ○ | X | X |

The invention claimed is:

1. A thermoplastic resin composition (D), which comprises: a polycarbonate resin (A); a polyester resin (B) which consists of diol structural units and dicarboxylic acid structural units, wherein the ratio of diol structural units having a cyclic acetal skeleton to all the diol structural units is 20 to 60 mol %; and a polyester resin (C) other than the polyester resin (B), wherein the ratio of the polycarbonate resin (A) to the total of the polycarbonate resin (A), the polyester resin (B) and the polyester resin (C) is 40 to 90 wt %, the ratio of the polyester resin (B) is 2 to 50 wt %, and the ratio of the polyester resin (C) is 8 to 20 wt %, and wherein the polyester resin (C) is polybutylene terephthalate resin.

2. The thermoplastic resin composition according to claim 1, wherein the polycarbonate resin (A) is a polycarbonate resin containing repeat units represented by formula (1) and/or formula (2):

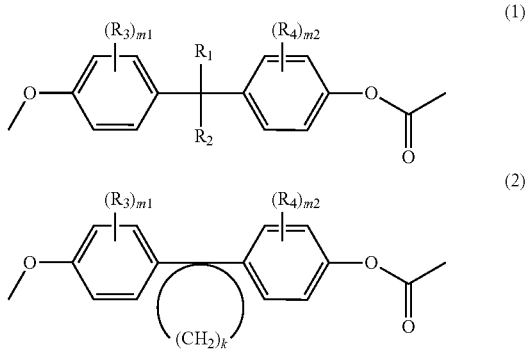

wherein: $R_1$ and $R_2$ are each independently selected from the group consisting of a hydrogen atom, a non-cyclic hydrocarbon group having 1 to 10 carbon atoms and an alicyclic hydrocarbon group having 5 to 10 carbon atoms; $R_3$ and $R_4$ are each independently selected from the group consisting of a non-cyclic hydrocarbon group having 1 to 10 carbon atoms, a halogen atom and a phenyl group; m1 and m2 are each independently 0, 1 or 2; and k is 4 or 5.

3. The thermoplastic resin composition according to claim 1, wherein the polycarbonate resin (A) is a polycarbonate of bisphenol A.

4. The thermoplastic resin composition according to claim 1, wherein the diol structural units having a cyclic acetal skeleton are diol structural units derived from a diol represented by formula (3):

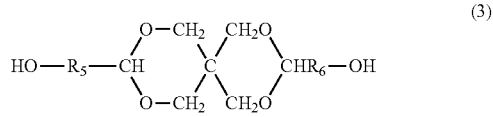

or formula (4):

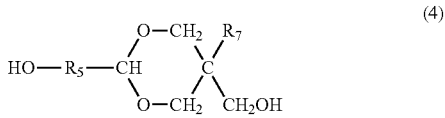

wherein $R_5$, $R_6$ and $R_7$ each independently represent a hydrocarbon group selected from the group consisting of an aliphatic hydrocarbon group having 1 to 10 carbon atoms, an alicyclic hydrocarbon group having 3 to 10 carbon atoms and an aromatic hydrocarbon group having 6 to 10 carbon atoms.

5. The thermoplastic resin composition according to claim 1, wherein the diol structural units having a cyclic acetal skeleton are diol units derived from 3,9-bis(1,1-dimethyl-2-hydroxyethyl)-2,4,8,10-tetraoxaspiro[5.5]undecane or diol structural units derived from 5-methylol-5-ethyl-2-(1,1-dimethyl-2-hydroxyethyl)-1,3-dioxane.

6. The thermoplastic resin composition according to claim 1, wherein diol structural units other than the diol structural units having a cyclic acetal skeleton are diol structural units derived from one or more types of diols selected from the group consisting of ethylene glycol, diethylene glycol, trimethylene glycol, 1,4-butanediol and 1,4-cyclohexanedimethanol.

7. The thermoplastic resin composition according to claim 1, wherein the ratio of structural units derived from an aromatic dicarboxylic acid to all the dicarboxylic acid structural units in the polyester resin (B) is 70 mol % or more.

8. The thermoplastic resin composition according to claim 7, wherein the aromatic dicarboxylic acid is one or more types of dicarboxylic acids selected from the group consisting of terephthalic acid, isophthalic acid, 1,4-naphthalenedicarboxylic acid, 1,5-naphthalenedicarboxylic acid, 2,6-naphthalenedicarboxylic acid and 2,7-naphthalenedicarboxylic acid.

9. A sheet obtained by using the thermoplastic resin composition (D) according to claim 1.

10. A multi-layer sheet comprising at least one layer containing the thermoplastic resin composition (D) according to claim 1.

* * * * *